United States Patent [19]

Takeyari

[11] Patent Number: 5,506,711
[45] Date of Patent: Apr. 9, 1996

[54] STAR TYPE MULTI-STAGE NETWORK

[75] Inventor: Ryoji Takeyari, Kokubunji, Japan

[73] Assignee: Hitachi, Ltd., Tokyo, Japan

[21] Appl. No.: 929,735

[22] Filed: Aug. 13, 1992

[30] Foreign Application Priority Data

Aug. 28, 1991 [JP] Japan .................................... 3-216893

[51] Int. Cl.$^6$ ...................................................... H04J 14/00
[52] U.S. Cl. .......................... 359/117; 359/121; 359/127; 359/128; 370/93
[58] Field of Search ................................... 359/114, 115, 359/116, 117, 118, 120, 121, 136, 124, 140, 125, 128, 137, 113, 181, 188, 127; 370/94.3, 93; 385/14, 3, 114, 115

[56] References Cited

U.S. PATENT DOCUMENTS

| | | | |
|---|---|---|---|
| 4,770,490 | 9/1988 | Gruenewald et al. | 385/115 |
| 4,779,265 | 10/1988 | O'Connor et al. | 370/93 |
| 4,821,255 | 4/1989 | Kobrinski | 359/128 |
| 4,914,648 | 4/1990 | Acampora et al. | 370/3 |
| 4,931,959 | 6/1990 | Brenner et al. | 364/525 |
| 4,947,389 | 8/1990 | Eng et al. | 370/85.12 |
| 4,961,617 | 10/1990 | Shahidi et al. | 385/114 |
| 4,991,168 | 2/1991 | Richards | 370/54 |
| 5,073,980 | 12/1991 | Prucnal et al. | 370/92 |
| 5,127,067 | 6/1992 | Delcoco et al. | 359/118 |
| 5,245,458 | 9/1993 | Taylor | 359/115 |
| 5,301,058 | 4/1994 | Olshansky | 385/3 |
| 5,311,604 | 5/1994 | Rogner et al. | 385/14 |

FOREIGN PATENT DOCUMENTS

| | | |
|---|---|---|
| 92114252.1 | of 0000 | European Pat. Off. . |
| 0422764 | 4/1991 | European Pat. Off. . |

OTHER PUBLICATIONS

'Terabit Lightwave Networks: The Multi Hop Approch', AT&T Technical Journal, Nov./Dec. 1987, vol. 66, Issue 6, pp. 21–34.

Proceedings of the IEEE Global Telecommunications Conference (Globecom), 15–18, Nov. 1987, pp. 1459–1467, Tokyo, Japan, A.S. Acampora, "A Multichannel Multihop Local Lightwave Network".

IEEE Network: The Magazine of Computer Communications, vol. 3, No. 1, Jan. 1989, New York, pp. 29–41, XP7819, A.S. Acampora, "An Overview of Lightwave Packet Networks".

Proceedings, IEEE Infocom '88, 27–31 Mar. 1, 1988, pp. 379–390, New Orleans US M. G. Hluchyj et al., "Shufflenet: An Applications of Generalized Perfect Shuffles to Multihop Lightwave Networks".

Proceedings, IEEE Conference on Computers and Communications, 27–30 Mar. 1991, pp. 506–512, Phoenix US, XP299080 P. K. McKinley, "Lightwave Multichannel Networks with Grid–Based Topologies".

IEEE Photonics Technology Letters, vol. 3, No. 5, May 1991, New York, US, pp. 487–489, M. Kavehrad et al.: *Selective–Broadcast Optical Passive Star Coupler Design for Dense WDM Networks.*

Feng, 'A Survey of Interconnection Networks' IEEE, Computer 12–1981, 12–27.

*Primary Examiner*—Douglas W. Olms
*Assistant Examiner*—Shick Hom
*Attorney, Agent, or Firm*—Kenyon & Kenyon

[57] ABSTRACT

A star type multi-stage network having the same connectivity graph between stages and having a physical topology of a star form, comprises a plurality of columns assigned with different specific transmission wavelengths, respectively, NIU's each including a transmitter for making a transmission on a wavelength assigned to a column to which that NIU (network interface unit) belongs and a receiver for receiving a wavelength assigned to a column from which reception is to be made, and a fundamental connection section including a connection portion formed by optical fibers or optical waveguides to provide a fundamental connection pattern between stages. Inputs and outputs of the optical fibers or optical waveguides are connected to couplers having inputs or outputs the number of which is equal to at least the number of the transmitters of the NIU's. Outputs of the transmitters of the NIU's are connected to inputs of the fundamental connection section corresponding to connectivity between stages. Inputs of the receivers of the NIU's are connected to outputs of the fundamental connection section corresponding to connectivity between stages.

2 Claims, 5 Drawing Sheets

STAR TYPE MULTI-STAGE NETWORK

BACKGROUND OF THE INVENTION

The present invention relates to a multi-channel, multi-stage network in which information is transmitted or exchanged with satisfactory efficiency, and more particularly to a method of configuration of a network which has the same connectivity between stages and has a physical topology of a star form.

In a single-channel LAN such as Ethernet, Token ring being popularized at the present time, a channel is shared among NIU's (network interface units). Therefore, the throughput per NIU is lowered in inverse proportion to the increase in number of NIU's. To improve the throughput, it is effective to provide a plurality of channels but the routing is required since nodes lie scattered at different channels. A shufflenet, which is one configuration of a multi-channel network, has been proposed as a network in which the lowering of the throughput in the single-channel network is suppressed and an effective routing is made. The shufflenet is disclosed by AT&T Technical Journal, November/December 1987, Volume 66, issue 6, pp. 21–34 and U.S. Pat. No. 4,931,959. The former reference shows a connectivity graph which defines a shufflenet (or an inter-NIU connection diagram) and examples of the shufflenet which are realized by topologies taking the forms of bus, ring and star. The shufflenet is a multi-stage network in which a group of NIU's are handled as one stage (hereinafter referred to as column) and the columns are interconnected by a connectivity graph called a perfect shuffle. In the shufflenet, provided that the number of transmitters and receivers per NIU is p and the number of columns is k, the number of NIU's per column is $p^k$ and the NIU's in the whole of the network is $k \times p^k$. In this case, the total number of channels amounts to $p \times k \times p^k$. FIG. 4 shows a connectivity graph disclosed by the above-mentioned reference in the case where p=2 and k=3. FIGS. 5A and 5B show the constructions which are disclosed by the reference and have physically a form of star. More particularly, FIG. 5A shows a construction, based on WDM (wavelength-division multiplexing), in which transmitters are assigned with different wavelengths and are connected by a star coupler, and FIG. 5B shows a construction in which all transmitters and receivers are connected by optical fibers in one-to-one correspondence.

However, the above prior art involves the following problem. Namely, in the (p, k) shufflenet, since the number of channels required is $p \times k \times p^k$, the number of wavelengths, required when the network is formed by a wavelength multiplexing transmission path shown in FIG. 5A, amounts to $p \times k \times p^k$, too. Thus, as the network scale becomes large, the number of wavelengths required is remarkably increased. Also, in the construction shown in FIG. 5B, the number of optical fibers required for connection is $p \times k \times p^k$, which forms a factor to restrict the installation, maintenance and extension of the network.

SUMMARY OF THE INVENTION

An object of the present invention is to facilitate a physical connection between NIU's by reducing the number of wavelengths used in a star type multi-stage network such as a shufflenet which has the same connectivity between stages.

In the present invention made directing attention to the fact that the connectivity graph between stages is always the same, a fundamental connectivity graph (hereinafter referred to as fundamental connection section) is uniquely formed by optical fibers or optical waveguides. Columns are assigned with different wavelengths, respectively, and the wavelengths are multiplexed onto the fundamental connection section by WDM.

Alternatively, the columns may be assigned with different CDM (code-division multiplexing) codes, respectively. The encoded signals are multiplexed onto the fundamental connection section by CDM.

Alternatively, the fundamental connection section may be formed by laminating optical ribbon fibers, optical fibers bundled or optical waveguides to make multiplexing based on SDM (space-division multiplexing).

Since a connection portion required for connectivity between stages is only the fundamental connection section, the number of optical fibers required for the connection portion is reduced to 1/k of that in the conventional shufflenet and the number of wavelengths required is reduced to k.

In the case where the multiplexing is made by CDM, the number of optical fibers required for the connection portion is reduced to 1/k of that in the conventional shufflenet and the number of wavelengths required is 1.

In the case where the multiplexing is made by SDM, the number of fibers required is not reduced but the connection and maintenance are facilitated.

Accordingly, the installation, maintenance and extension of the network are facilitated.

DETAILED DESCRIPTION

Figure 1:
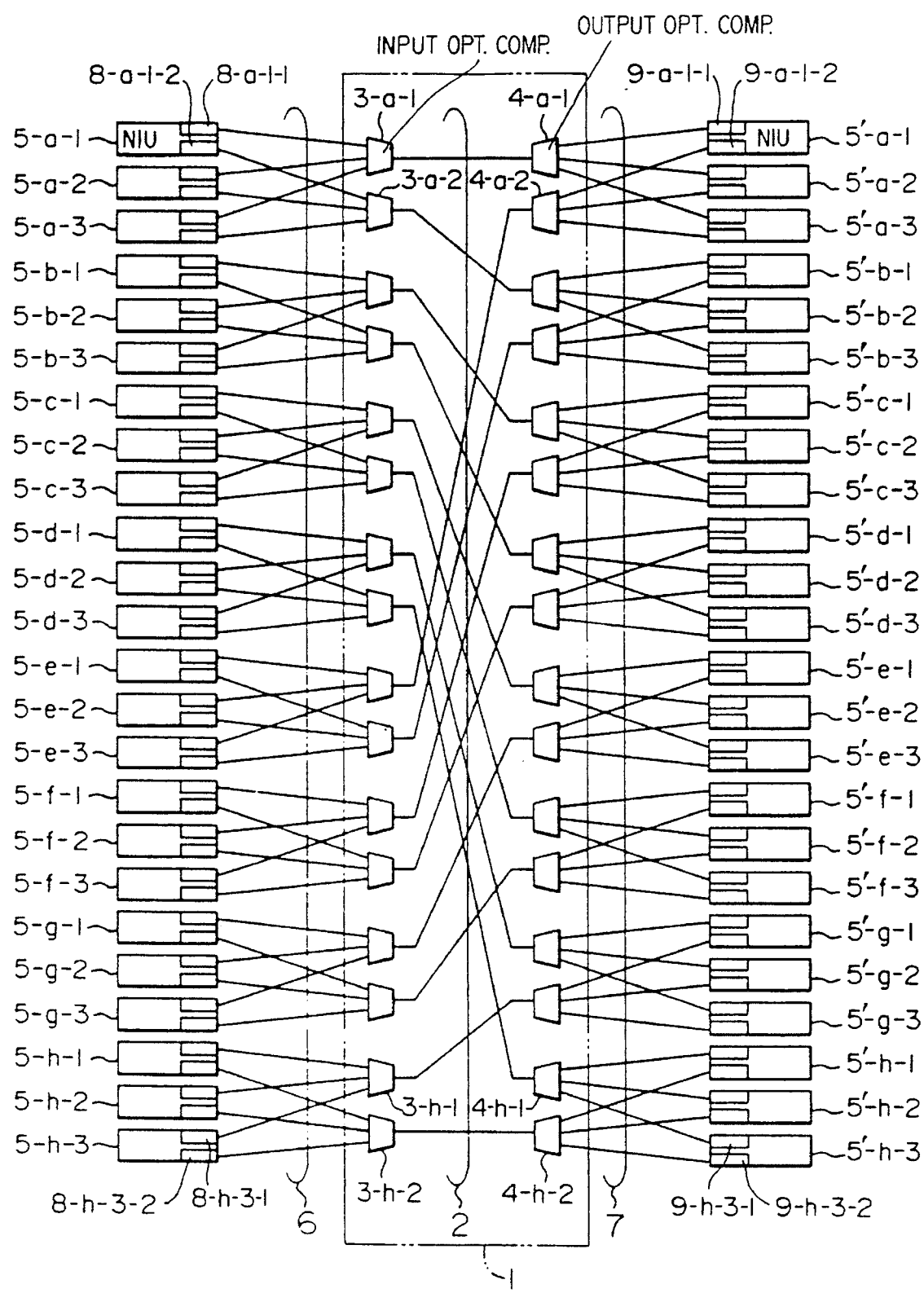
FIG. 1 is a diagram showing the construction of a network according to an embodiment of the present invention.
Figure 2:
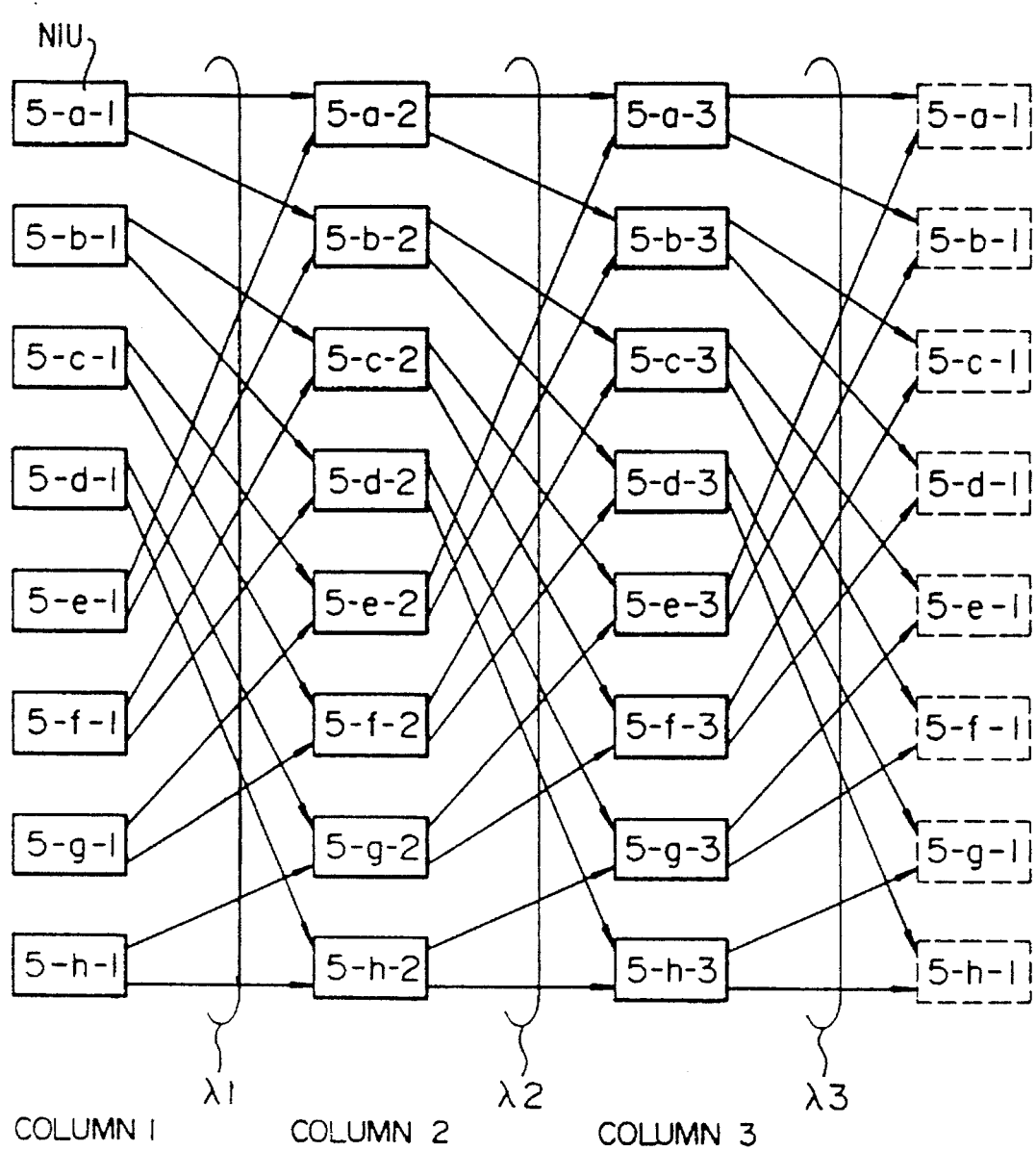
FIG. 2 is a diagram showing a connectivity graph and the assignment of wavelengths used in the present invention.

An embodiment of the present invention will be shown using FIGS. 1 and 2. Herein, a shufflenet of (p=2, k=3) is shown. However, a similar construction can be used for another case. FIG. 1 is a diagram showing the physical construction of a network according to the present invention. Reference numeral 1 designates a fundamental connection section, numeral 2 optical fibers for connection which form a fundamental shuffle connection graph, numeral 3 optical couplers for input, numeral 4 optical couplers for output, numerals 5 and 5' NIU's, numeral 6 optical fibers from the NIU's to the fundamental connection section, numeral 7 optical fibers from the fundamental connection section to the NIU's, numeral 8 transmitters, and numeral 9 receivers. In FIG. 1, the transmitting NIU 5 and the receiving NIU 5' are shown separately from each other to make a signal flow easy to see. In actuality, however, they are physically together. FIG. 2 shows the assignment of wavelengths to the columns.

Figure 3:
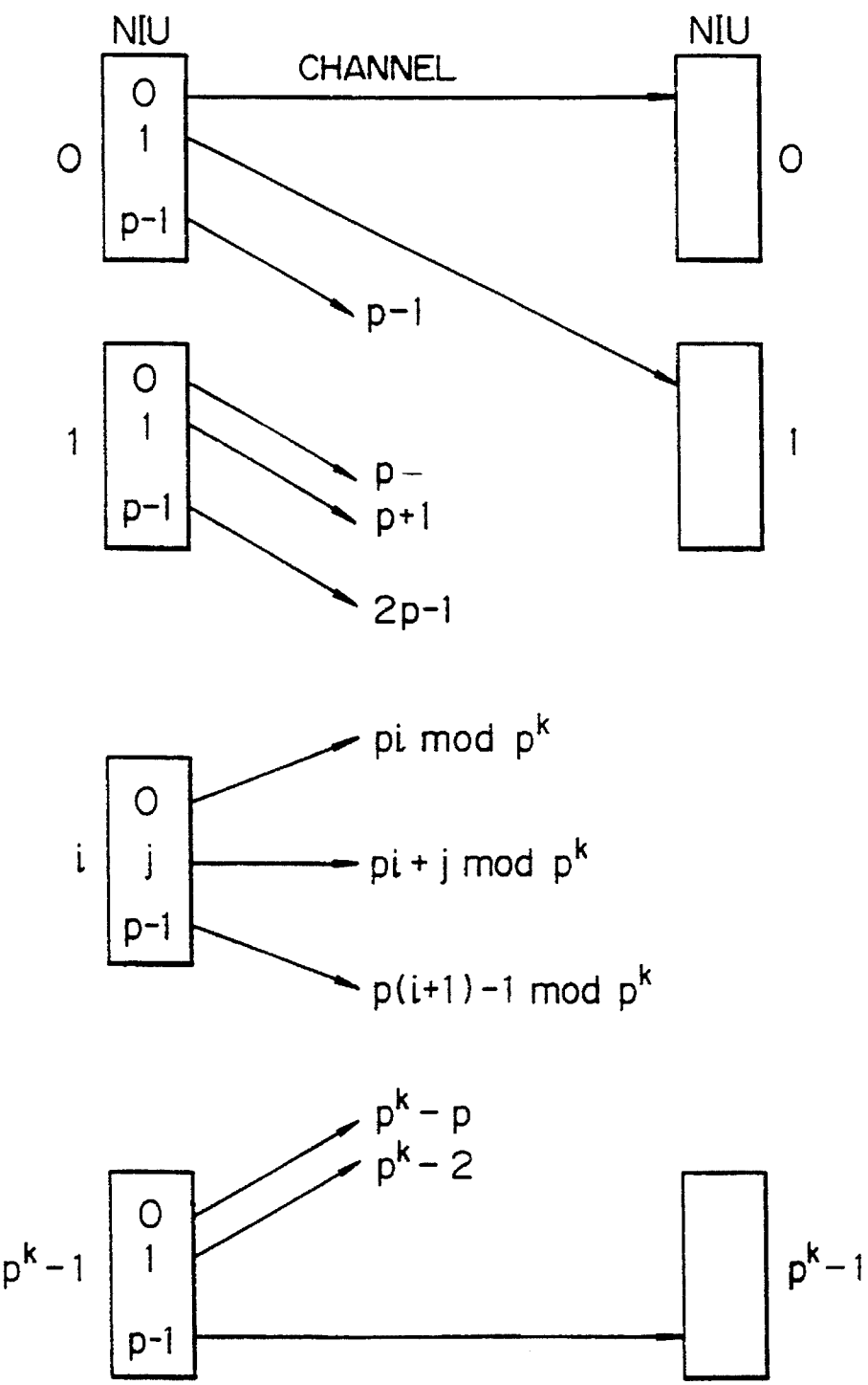
FIG. 3 is a diagram showing a connection rule in a shufflenet connectivity graph.

There are some references showing examples in which a connectivity graph between columns is made different by changing the arrangement of NIU's in the columns. In a connection pattern used in the present invention, however, a connection pattern between columns must be the same, as shown in FIG. 2. A connection rule in a (p, k) shufflenet is shown in FIG. 3. Namely, an output j ($0 \leq j \leq p-1$) of NIUi ($0 \leq i \leq p^k-1$) is connected to NIU (p×i+j mod $p^k$) ("mod" representing modulo arithmetic). Accordingly, in the case where the shufflenet is constructed by a physical star topology, a single connection portion can be used in common. In the present embodiment, multiplexing based on WDM is used to use the fundamental connection section in common. In other words, the common use of the fundamental connection section is enabled in such a manner that different specific transmission wavelengths are assigned to the columns, respectively, an NIU transmits a signal by a transmitter of a specific wavelength assigned to a column to which that NIU belongs, and these transmission signals at the corresponding position of a different column in the connectivity graph are multiplexed onto one input of the fundamental connection section.

Figure 4:
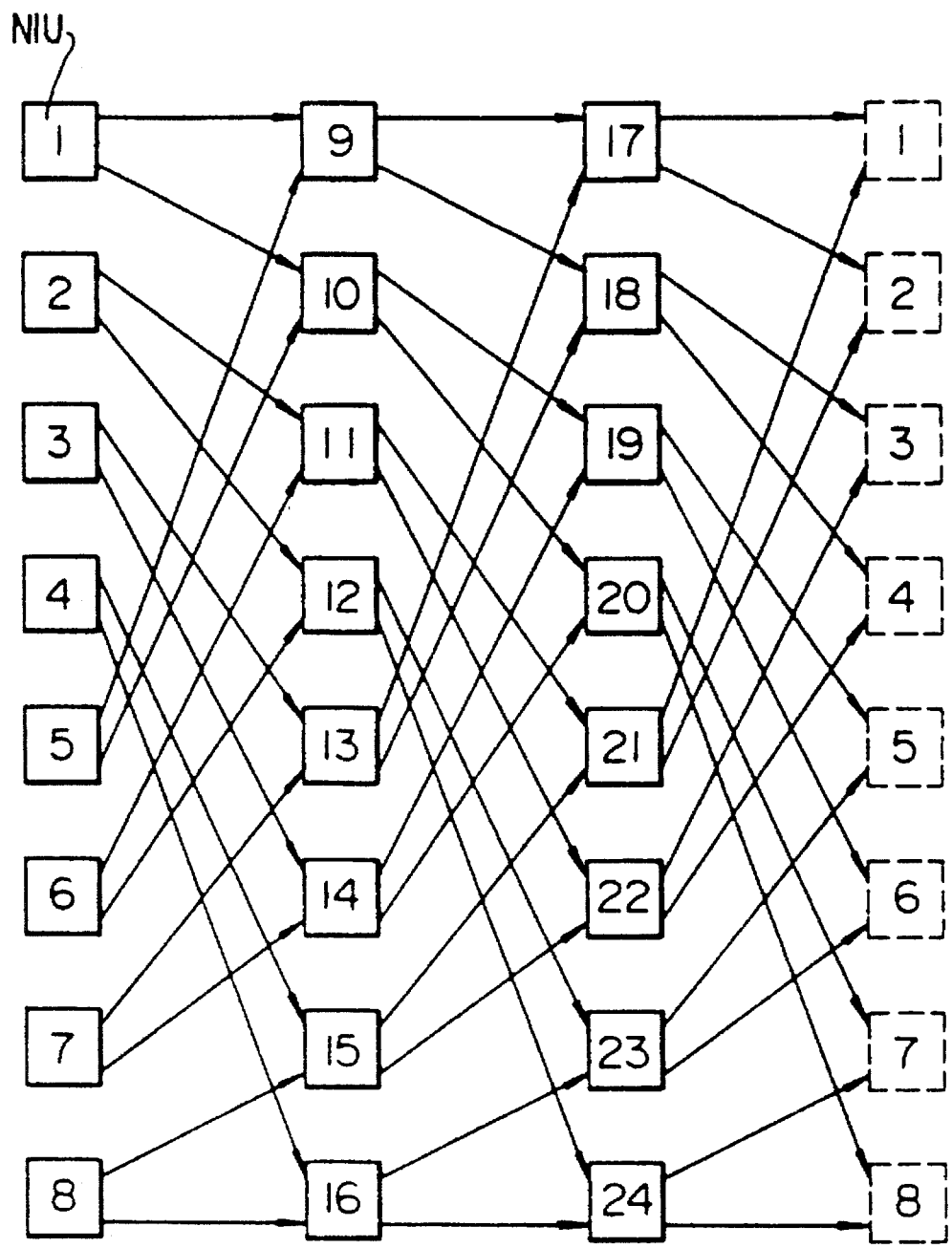
FIG. 4 shows a shufflenet connectivity graph according to the prior art.
Figure 5A:
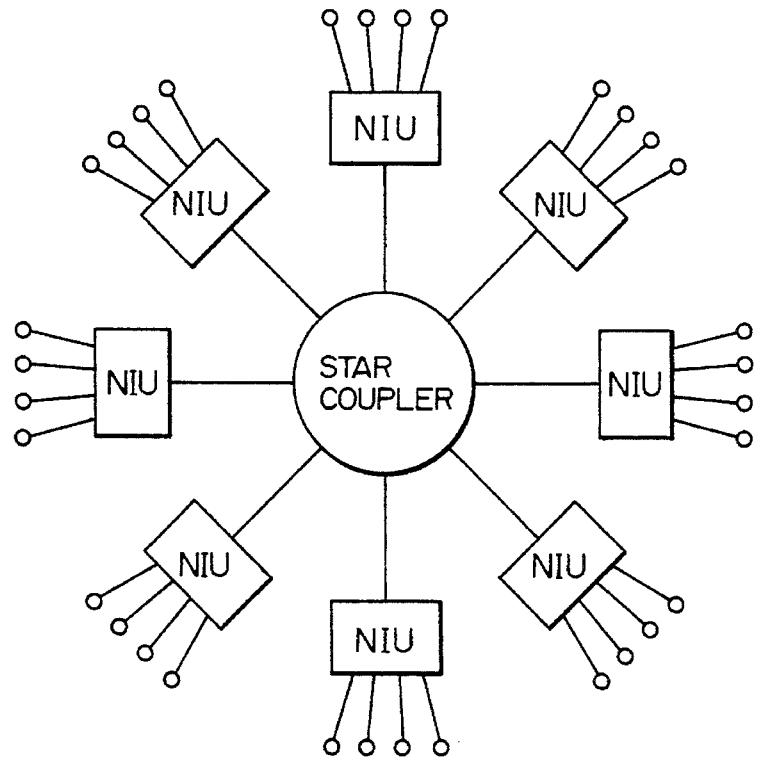
FIGS. 5A and 5B show different forms of a physical topology for the star type shufflenet according to the prior art.
Figure 5B:
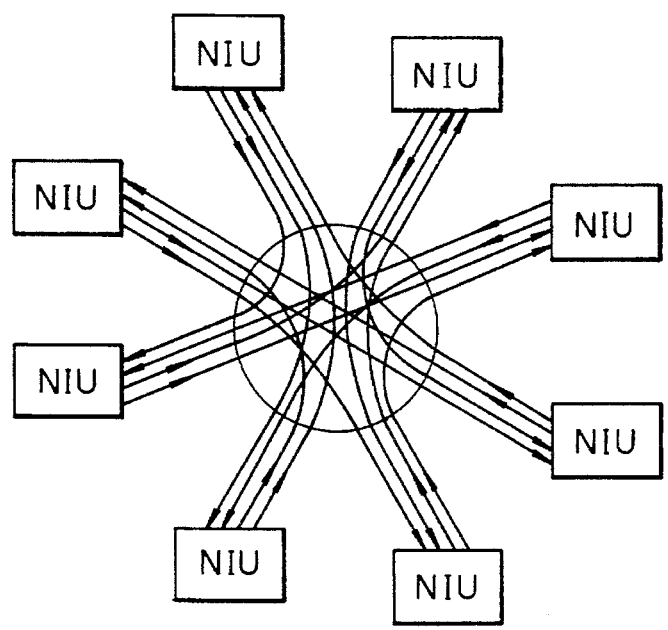

In FIG. 2, the NIU numbers are changed from those shown in FIG. 4 to facilitate the explanation of the present invention. The NIU numbers of NIU's belonging to a column x (x=1 to 3) are designated by 5-y-x (y: alphabets of a to h). The assignment of wavelengths is such that a transmission wavelength for NIU's belonging to the column x is designated by $\lambda x$. Accordingly, a transmitter 8-y-x-z (z=1 or 2) of an NIU 5-y-x in FIG. 1 makes a transmission on a wavelength $\lambda x$. The connection between the transmitters 8 and the optical couplers 3 is as follows. Namely, the output of a transmitter 8-y-x-1 is connected to an optical coupler 3-y-1 and the output of a transmitter 8-y-x-2 is connected to an optical coupler 3-y-2. In this case, since the multiplexing with different wavelengths $\lambda 1$, $\lambda 2$ and $\lambda 3$ is made by the optical couplers 3-y-1 and 3-y-2, there is no fear of signal interference. The optical fibers 2 in the fundamental connection section 1 correspond to a connectivity graph for one column in FIG. 2.

Similarly, an optical coupler 4-y-1 for output is connected to a receiver 9-y-x-1 in an NIU 5-y-x through the optical fiber 7 for output and the output of an optical coupler 4-y-2 is connected to a receiver 9-y-x-2. Herein, a receiver 9-y-x-z is designed such that it selectively receives a wavelength $\lambda$ (x−1) ($\lambda k$ when x−1 is 0). This can be realized easily by providing an optical filter in front of a photodetector or using heterodyne detection.

With the above construction, a network having the logical topology shown in FIG. 2 can be formed. The number of wavelengths used in the present embodiment is k (=3) and is greatly reduced as compared with that in the conventional WDM shufflenet. This means that the fabrication and maintenance of the network is facilitated in that the kinds of transmitters/receivers become less. Also, according to the present invention, the network can be extended (or k can be made large) with no need of changing the connection of the transmitters/receivers having already been connected to the optical couplers 3 and 4 but by newly adding and connecting NIU's and optical couplers and merely changing the connection portions of the connecting optical fibers 2. Accordingly, the extension of the network is facilitated.

The optical couplers 3 in FIG. 1 can be replaced by WMUX's (wavelength multiplexers). In this case, it is necessary to make the correspondence of input ports of the WMUX's to the wavelengths of the transmitters, but a loss upon wave multiplexing can be reduced.

Similarly, the couplers 4 in FIG. 1 can be replaced by WDMUX (wavelength demultiplexers). In this case, it is necessary to make a correspondence between output ports of the WDMUX's and the receivers in accordance with the connectivity graph of the network, but there is merit in that the loss upon wave demultiplexing becomes small and receivers having no wavelength selectivity or dependency can be used.

In the foregoing embodiment, the common use of the fundamental connection section 1 is attained by multiplexing the fundamental connection section 1 by WDM. However, a similar common use becomes possible even by CDM. Namely, in FIG. 2, specific CDM codes x instead of the specific wavelengths are assigned to the columns, respectively. And, in FIG. 1, a transmitter 8-y-x-z makes a transmission with encoding by a code x. On the other hand, a receiver 9-y-x-z is a CDM receiver which recovers the signal by de-spreading with a code (x−1) (code k when x−1 is 0). With this construction, a network having the connectivity graph shown in FIG. 2 can be formed.

Similarly, the multiplexing at the fundamental connection section 1 can be made by SDM. In the case of SDM, the fundamental connection section 1 is formed by optical ribbon fibers or optical fibers bundled so that a corresponding relationship can be distinguished, for example, by means of the classification of fibers by color. Though this construction is different from the full optical fiber connection of the prior art only in that the connections are regulated, the extension of the network is facilitated.

In the foregoing embodiments, the connection in the fundamental connection section 1 is realized by optical fibers. The connection can be realized by an optical plane circuit using optical waveguides, thereby facilitating mass production.

According to the present invention, a star type shufflenet can be formed easily by multiplexing signals of different columns onto a common fundamental connection section, thereby facilitating the extension and maintenance.

I claim:

1. A multi-stage network having columns constituting a plurality of network interface units (NIUs) that are distinguished by the position in the columns and connected to each other by physical topologies of a star form, the logical topologies of each stage, that is a connectivity graph between network interface units belonging to adjacent columns, being the same, comprising:

the columns being assigned with different specific transmission wavelengths, respectively;

each NIU including at least two transmitters for making a transmission on a wavelength assigned to that one of said plurality of columns to which that NIU belongs, and at least two receivers having no wavelength dependency;

a fundamental connection section including a connection portion formed by optical fibers or optical waveguides to provide a fundamental connection pattern between stages, inputs of said optical fibers or optical waveguides being connected to couplers having inputs the number of which is equal to at least the number of the columns of said multi-stage network, outputs of said optical fibers or optical waveguides being connected to wave demultiplexers which have demultiplexing characteristics corresponding to the wavelengths assigned to said columns; and means for connecting outputs of the transmitters of said network interface units to inputs of said fundamental connection section corresponding to the position in the columns and for connecting inputs of the receivers of said connection section which outputs receive wavelengths, corresponding to the position in the columns.

2. A multi-stage network according to claim 1, wherein said couplers at the inputs of said fundamental connection section include wave multiplexers which have wavelength dependency, and the outputs of the transmitters of said network interface units are connected to corresponding input ports of said wave multiplexers of said fundamental connection section corresponding to the position in the columns.

* * * * *